US006617418B1

(12) United States Patent
Magnusson et al.

(10) Patent No.: US 6,617,418 B1
(45) Date of Patent: Sep. 9, 2003

(54) HYPERBRANCHED DENDRITIC POLYETHER AND PROCESS FOR MANUFACTURE THEREOF

(75) Inventors: Helen Magnusson, Solna (SE); Eva Malmstrom, Sollentuna (SE); Anders Hult, Taby (SE); Nicola Rehnberg, Perstorp (SE)

(73) Assignee: Perstorp AB, Perstorp (SE)

( * ) Notice: Subject to any disclaimer, the term of this patent is extended or adjusted under 35 U.S.C. 154(b) by 0 days.

(21) Appl. No.: 09/937,350

(22) PCT Filed: Mar. 15, 2000

(86) PCT No.: PCT/SE00/00506

§ 371 (c)(1),
(2), (4) Date: Jan. 25, 2002

(87) PCT Pub. No.: WO00/56802

PCT Pub. Date: Sep. 28, 2000

(30) Foreign Application Priority Data

Mar. 23, 1999 (SE) ................................................ 9901033

(51) Int. Cl.[7] .......................... C08G 59/00; C08G 65/18
(52) U.S. Cl. ........................ 528/417; 528/403; 528/408; 528/409; 528/426; 528/486
(58) Field of Search .............................. 528/417, 403, 528/408, 409, 425, 486

(56) References Cited

U.S. PATENT DOCUMENTS 4,393,199 A    7/1983   Manser

FOREIGN PATENT DOCUMENTS

| EP | 0103297 | 3/1984 |
|----|---------|--------|
| WO | 9015092 | 12/1990 |

OTHER PUBLICATIONS

Macromol.Rapid Commun, vol. 20, 1999, Helene Magnusson et al, "Synthesis of hyperbranched aliphatic polyethers via cationic ring–opening polymerization of 3–thyl–3–(hydroxymenthyl)oxetane", p. 453–457.

Macromolecules, vol. 27, No. 2, 1994, R. Tokar et al, "Cationic Polymerization of Glycidol: Coexistence of the Activated monomer and Active Chain End Mechanism", p. 320–322.

Journal of Polymer Science: Part A: Polymer Chemistry, vol. 36, 1998, Young H. Kim, "Hyperbranched Polymers 10 Years After", p. 1685–1698.

Macromol. Rapid Commun., vol . 20, 1999, Melania Bednarek et al, "Branched polyether with multiple primary hydroxyl groups: polymerization of 3–3thyl–3–hydroxymethyloxetane", p. 369–372.

Macromol.Mater. Eng., vol. 275, 2000, D. Schmaljohann et al, "New Coating systems based on vinyl ether–and oxetane–modified hyperbranched polyesters" p. 31–41.

*Primary Examiner*—Duc Truong
(74) *Attorney, Agent, or Firm*—Stevens, Davis, Miller & Mosher, L.L.P.

(57) ABSTRACT

A hyperbranched dendritic polyether, which optionally is further processed, such as further chain extended, chain terminated and/or functionalised. The hyperbranched dendritic polyether is obtained in a process comprising the step of thermally initiated cationic ring-opening polymerisation of at least one oxetane having at least two reactive groups of which at least one is an oxetane group. The thermally initiated ring-opening polymerisation is performed using an effective amount of at least one initiator, such as a thermal onium salt, a Lewis acid and/or a Brønsted acid. The terminal groups in said hyperbranched dendritic polyether are substantially hydroxyl groups and used for said optional further processing.

58 Claims, No Drawings

HYPERBRANCHED DENDRITIC POLYETHER AND PROCESS FOR MANUFACTURE THEREOF

CROSS-REFERENCE TO RELATED APPLICATIONS

This application is a 371 application of International Application No. PCT/SE00/00506, filed Mar. 15, 2000, claiming the benefit of Swedish Application No. 9901033-2, filed Mar. 23, 1999, the entire disclosures of which are incorporated herein by reference.

The present invention refers to a hyperbranched dendritic polyether obtainable in a process comprising the step of thermally initiated cationic ring-opening of at least one oxetane having at least two reactive groups of which at least one is an oxetane group. In a further aspect, the present invention refers to a process for the manufacture of said hyperbranched dendritic polyether.

Macromolecular architecture has received increasing attention during the last decade. The interest is governed by the realisation that new and/or improved material properties can be obtained by altering the architecture of the polymers. Especially dendritic polymers, that is dendrimers and hyperbranched polymers, have received considerable attention in this context. The most characteristic features of dendritic polymers in contrast to linear polymers or ordinarily and randomly branched polymers are the absence of entanglements and the low viscosity in bulk.

Dendritic polymers are based on for instance $AB_x$ monomers and are highly branched macromolecules with a multitude of end-groups. Dendrimers are monodisperse, exact structures where all branch points are utilised. Due to their well defined structure dendrimers are tedious and often expensive to synthesise. Hyperbranched polymers are polydisperse and some of the $AB_x$ monomers are incorporated in a linear fashion, resulting in a less well defined architecture. Hyperbranched polymers are less complicated to synthesise and, therefore, less expensive which makes them more attractive than dendrimers for large-scale applications.

Conceptually, condensation monomers of $AB_x$ type are the easiest to identify and a wide variety of such monomers have also been demonstrated to yield hyperbranched and dendritic polymers. Various dendritic, including dendrimers, polyesters and processes for production thereof are disclosed in the Swedish patents 468 771 and 503 342. Polyether dendrimers produced using complex and expensive protective chemistry are discussed but not further evaluated or prepared in the European patent 115 771. More recently, vinyl monomers, bearing both an initiating and a propagating function has been utilised to result in hyperbranched or dendritic polymers, both via cationic and free radical procedures—J. M. J. Fréchet et al., *Science*, 269, 1080 (1995), C. J. Hawker, et al., *J. Am. Chem. Soc.* 117, 10763 (1995) and S. G. Gaynor et al., *Macromolecules* 29, 1979 (1996).

So far no successful ring-opening polymerisation resulting in hyperbranched dendritic polyethers, including dendrimers, has been reported. The ring-opening polymerisation of 3-hydroxymethyl-3-methyl oxetane under basic conditions was reported by Y. H. Kim in *J. Polym. Sci. Part A: Polym. Chem.*, 36, 1685 (1998). However, only a low molar mass polyether was obtained.

The present invention provides quite unexpectedly hyperbranched dendritic polyethers by means of cationic ring-opening polymerisation of at least one oxetane. The present invention accordingly provides hyperbranched dendritic polyethers readily synthesised in bulk. The hyperbranched dendritic polyether of the present invention has like most of the well-known hyperbranched dendritic polyesters terminal hydroxyl groups and can accordingly like said polyesters be further processed to yield hyperbranched dendritic polymers having desired end-groups and tailor-made final properties. Hyperbranched dendritic polyethers are, as polyethers normally are, less susceptible to hydrolysis and have a slightly more flexible main chain than corresponding polyesters, which properties imply utilisation, and pending improved properties, in application areas wherein esters are less suitable. A further advantage is that the hyperbranched polyether of the present invention in most cases easily can be purified by simple precipitation.

The hyperbranched dendritic polyether of the present invention is accordingly obtainable in a process comprising the step of thermally initiated cationic ring-opening polymerisation of at least one oxetane having at least two reactive groups of which at least one is an oxetane group. The thermally initiated ring-opening polymerisation is performed using an effective amount of at least one initiator, such as an onium salt, a Lewis acid and/or a Brønsted acid. Terminal groups or functions in obtained hyperbranched dendritic polyether are normally and substantially hydroxyl groups. The hyperbranched dendritic polyether can also optionally comprise one or more other monomeric or polymeric molecules. The hyperbranched dendritic polyether can furthermore and optionally be a further processed polymer, such as further chain extended, chain terminated and/or functionalised.

The hyperbranched dendritic polyether of the present invention is as disclosed above obtainable in a process comprising said oxetane, whereby the oxetane for instance may be part of a reaction mixture comprising said oxetane in an amount, such as at least 1%, sufficient to provide branching. The oxetane may have two or more oxetane groups or one or more oxetane groups and one or more hydroxyl groups and similar or other suitable combinations of groups and functions. A reaction mixture comprising said oxetane can in addition thereto comprise at least one additional oxetane having at least one oxetane group and optionally one or more other reactive groups and/or at least one alcohol, epoxide, anhydride, tetrahydrofuran and/or lactone.

Said at least one oxetane having said at least two reactive groups is in preferred embodiments of the present invention a compound of the general formula

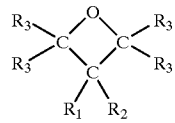

wherein $R_1$ is alkyl, alkyloxy, alkyloxyalkyl, aryloxyalkyl, hydroxyalkyl, hydroxyalkyloxy, aryl, aryloxy, hydroxyaryl or hydroxyaryloxy, $R_2$ is hydroxyalkyl, hydroxyalkyloxy, hydroxyaryl or hydroxyaryloxy, and wherein each $R_3$ independently is hydrogen, alkyl, alkyloxy, alkyloxyalkyl, aryloxyalkyl, hydroxyalkyl, hydroxyalkyloxy, aryl, aryloxy, hydroxyaryl or hydroxyaryloxy. Said alkyl is preferably linear or branched alkanyl or alkenyl having 1 to 24, such as 3 to 24, 1 to 12, 4 to 12 or 2 to 8, carbon atoms. The oxetane is in especially preferred embodiments an oxetane of a 2-alkyl-2-hydroxyalkyl-1,3-propanediol, a 2,2-di(hydroxyalkyl)-1,3-propanediol, a 2-alkyl-2-hydroxyalkyloxy-1,3-propanediol, a 2,2-di(hydroxyalkyloxy)-1,3-propanediol or a dimer, trimer or polymer of said 1,3-propanediol, wherein said alkyl independently and preferably is linear or branched alkanyl or alkenyl having 3 to 24, such as 4 to 12, carbon atoms. The most preferred embodiments of the present invention comprises an oxetane of a tri and polyalcohol, such as trimethylolethane, trimethylolpropane, pentaerythritol, ditrimethylolethane, ditrimethylolpropane or dipentaerythritol.

The initiator is preferably at least one onium salt, such as a sulphonium, oxonium and/or iodonium salt, and can be exemplified by a compound of structural formula

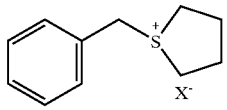

wherein X is a halogen containing group. The initiator according to said formula can be exemplified by benzyltetramethylenesulphonium hexafluoroantimonate ($X^-$ is $SbF_6^-$), benzyltetramethylenesulphonium hexafluorophosphate and benzyltetramethylenesulphonium trifluoromethanesulphonate. The initiation proceeds in such a case by a reversible generation of the benzyl cation which is stabilised by the non-nucleophilic anion. The benzyl cation is responsible for the initiation of the polymerisation by addition to the nucleophilic oxetane ring.

Further initiators can be found among Lewis acids, such as $BF_3$, $AlCl_3$, $FeCl_3$ and/or $SnCl_4$, and Brønsted acids such as naphthalene sulphonic acid, para-toluene sulphonic acid, methane sulphonic acid, trifluoromethane sulphonic acid, trifluoroacetic acid, sulphuric acid and/or phosphoric acid.

Embodiments of the hyperbranched dendritic polyether of the present invention include species being further processed, whereby at least one spacing or branching monomeric or polymeric chain extender is added to at least one terminal hydroxyl group in said polyether. Spacing or branching chain extenders include in various embodiments of the present invention for instance hydroxyfunctional carboxylic acids, having at least one hydroxyl group and at least one carboxyl group, such as 2,2-bis(hydroxymethyl) propanoic acid, 2,2-bis(hydroxymethyl)butanoic acid, 2,2-bis(hydroxymethyl)pentanoic acid, 2,3-dihydroxypropanoic acid, hydroxypentanoic acid, hydroxypropanoic acid or 2,2-dimethyl-3-hydroxypropanoic acid as well as mixtures and polymers comprising one or more of said acids. Further suitable chain extenders are for instance lactones, which preferably are exemplified by β-propiolactone, γ-butyrolactone, δ-valerolactone, ε-caprolactone and/or ζ-enantholactone, including mixtures and/or polymers of said lactones.

Further embodiments of the hyperbranched dendritic polyether of the present invention include species being further or yet further process, whereby at least one monomeric or polymeric chain stopper for instance having at least one carboxyl, anhydride, epoxide and/or isocyanate group is added to at least one terminal hydroxyl group or to at least one optional chain extender. Suitable chain stoppers can for instance be selected from the group consisting of saturated or unsaturated monofunctional carboxylic acids or, where applicable, anhydrides thereof, diisocyanates, oligomers and adducts of diisocyanates, glycidyl esters and ethers, epoxidised monocarboxylic acids and corresponding triglycerides, and/or esters of at least one di, tri or polyfunctional carboxylic acid, which esters have at least one carboxyl group, preferably a single carboxyl group. Preferred chain stoppers can be exemplified by lauric acid, linseed fatty acid, soybean fatty acid, tall oil fatty acid, dehydrated castor fatty acid, crotonic acid, capric acid, caprylic acid, acrylic acid, methacrylic acid, benzoic acid, para-tert.butylbenzoic acid, abietic acid, sorbinic acid, epoxidised soybean fatty acid, trimethylolpropane diallyl ether maleate, toluene-2,4-diisocyanate, toluene-2,6-diisocyanate, hexamethylene diisocyanate and isophorone diisocyanate.

Yet further embodiments of the hyperbranched dendritic polyether of the present invention include species being further or yet further process by means of epoxidation, allylation, acrylation and/or grafting of at least one terminal hydroxyl group, at least one optional chain extender and/or at least one optional chain stopper. Epoxidation is suitably performed as a reaction with at least one epihalohydrin, such as epichlorohydrin, or as a reaction with at least one oxidising agent selected from the group consisting of peroxy acids or anhydrides and haloperoxy acids or anhydrides, such as peroxyformic acid, peroxyacetic acid, peroxybenzoic acid, m-chloroperoxybenzoic acid, trifluoroperoxyacetic acid or mixtures thereof or therewith. Allylation is preferably performed as a reaction with at least one allylhalide, such as allylchloride or allylbromide, and acrylation as a reaction with methacrylic, acrylic and/or crotonic acid or corresponding anhydride or halide or alternatively as a reaction with an ester or a polyester of any of said acids.

The hyperbranched dendritic polyether according to the present inventions is suitably and advantageously used as a product per se or as a component, raw material, in the manufacture of a large number of resinous and polymeric products.

In a further aspect, the present invention refers to a process for manufacture of a hyperbranched dendritic polyether, which optionally is further processed such as further chain extended, chain terminated and/or functionalised. The process comprises the step of thermally initiated ring-opening polymerisation of at least one oxetane having at least two reactive groups of which at least one is an oxetane group. The ring-opening polymerisation is performed in the presence of an effective amount of at least one initiator. Employed oxetane and initiator are in various embodiments as disclosed above. The process furthermore optionally comprises the steps of chain extension, chain termination and/or functionalisation. These steps of the present invention employ monomeric and polymeric materials as disclosed above.

The process of the present invention thus comprises at least one oxetane having at least two reactive groups of which at least one is an oxetane group or a mixture comprising said oxetane in an amount, such as at least 1%, sufficient to provide branching. Said oxetane may for instance have two or more oxetane groups, one or more oxetane groups and one or more other reactive groups, such as hydroxyl one or more hydroxyl group. A reaction mixture comprising said oxetane can in addition thereto comprise at least one additional oxetane having at least one oxetane group and optionally one or more other reactive groups and/or at least one alcohol, epoxide, anhydride, tetrahydrofuran and/or lactone.

Additional monomeric or polymeric molecules present in a reaction mixture comprising said oxetane having at least two reactive groups are for example suitably found among aliphatic, cycloaliphatic and aromatic mono, di, tri or polyalcohols, such as ethylene glycol, diethylene glycol, triethylene glycol, polyethylene glycol, propylene glycol, dipropylene glycol, tripropylene glycol, polypropylene glycol, neopentyl glycol, dimethylolpropane, glycerol, trimethylolethane, trimethylolpropane, pentaerythritol, ditrimethylolethane, ditrimethylolpropane, anhydroenneaheptitol, dipentaerythritol, sorbitol or mannitol. Further suitable embodiments of said molecules include adducts of said alcohols, such as hydroxysubstituted allyl ethers, alkoxylates and acetals. Hydroxysubstituted allyl ethers can be exemplified by glycerol monoallyl ether, glycerol diallyl ether, trimethylolpropane monoallyl ether, trimethylolpropane diallyl ether, pentaerythritol monoallyl ether, pentaerythritol diallyl ether and pentaerythritol triallyl ether. Alkoxylates can be exemplified by reaction products of glycerol, trimethylolethane, trimethylolpropane or pentaerythritol and at least one alkylene oxide, such as ethylene oxide, propylene oxide, butylene oxide, phenylethylene oxide or mixtures thereof. These reaction products include for instance trimethylolpropane triethoxylate, trimethylolpropane tripropoxylate, pentaerythritol triethoxylate and pentaerythritol pentaethoxylate. Acetals are suitably exemplified by 1,3-dioxane alcohols and 1,3-dioxolane alcohols, such as 4-hydroxymethyl-1,3-dioxolane, 5-methyl-5-hydroxymethyl-1,3-dioxane, 5-ethyl-5-hydroxymethyl-1,3-dioxane and/or 5,5-dihydroxymethyl-1,3-dioxane. Molecules one or more epoxide groups include for instance mono, di, tri or polyfunctional epoxides, such as condensation products between at least one phenol and at least one aldehyde, oligomers of such condensation products, glycidyl esters and ethers as well as mono, di and triglycidyl substituted isocyanurates. Anhydrides are found among anhydrides of mono, di, tri and polyfunctional carboxylic acids. A lactones is advantageously selected from the group consisting of β-propiolactone, γ-butyrolactone, δ-valerolactone, ε-caprolactone and/or ζ-enantholactone.

Without further elaboration, it is believed that one skilled in the art can, using the preceding description, utilise the present invention to its fullest extent. These and other objects and the attendant advantages will be more fully understood from the following detailed description, taken in conjunction with specific embodiments, which are to be construed as merely illustrative and not limitative of the remainder of the disclosure in any way whatsoever. Example 1 illustrates preparation of a hyperbranched dendritic polyether by means of cationic ring-opening polymerisation of an oxetane having one oxetane group and one hydroxyl group. Example 2 illustrates further chain extension/termination by addition of a lactone.

EXAMPLE 1

34.5 mmoles of 3-ethyl-3-(hydroxymethyl)oxetane and 0.2% by weight of benzyltetramethylene sulphonium hexafluoroantimonate were charged in a round bottomed flask. The flask was then immersed in a preheated oil bath and stirred at 120° C. for 20 minutes. After cooling, the polymer, a clear, hard solid, was dissolved in hot ethanol, cooled and precipitated into cold diethyl ether twice.

Non-quantitative $^1$H NMR and quantitative $^{13}$C NMR proved obtained polymer to be a hydroxyfunctional hyperbranched polyether with no rings present in the final polymer. Said NMR gave following result:

$^1$H NMR (DMSO-d$_6$): d 0.6–0.9 (s, —CH$_3$), d 1.2–1.35 (m, —CH$_2$CH$_3$), d 3.05–3.2 (s, —CH$_2$—O—), d 3.2–3.3 (s, —CH$_2$OH), d 4.1–4.2 (s, —OH).

$^{13}$C NMR (DMSO-d$_6$): d 6–9 (q, —CH$_3$), d 20.5–24 (3 t, —CH$_2$CH$_3$), d 42.5–44 (s, —C—), 60–63.5 (t, —CH$_2$—OH), 70–73 (t, —CH$_2$—O—).

The molecular weight and polydispersity of the hyperbranched polyether was analysed by SEC (Size Exclusion Chromatography) giving following result:

Molecular weight: 5251

Polydispersity: 1.26

DSC (Differential Scanning Calorimetry) showed that the hyperbranched polyether was amorphous, having a glass transition temperature of 54° C.

Thermogravimetric analysis showed that obtained hyperbranched polyether is stable up to 280° C. under inert atmosphere.

EXAMPLE 2

Chain extension/chain termination by reaction between ε-caprolactone and the hyperbranched polyether obtained in Example 1.

409 mg of the dried hyperbranched polyether of Example 1 was charged in a round bottomed flask equipped with a stir bar and dissolved in 6.02 g of distilled ε-caprolactone. The flask was immersed in a preheated oil bath at 110° C. The reaction was initiated by adding a drop of tin octoate. The reaction was left for 24 hours. The polymer was dissolved in 200 ml of tetrahydrofuran and precipitated into cold methanol.

The molecular weight and polydispersity of the chain extended/chain terminated hyperbranched polyether was analysed by SEC (Size Exclusion Chromatography) giving following result Molecular weight: 58129

Polydisperity: 1.23

What is claimed is:

1. A hyperbranched dendritic polyether, which optionally is further processed, wherein said hyperbranched dendritic polyether is obtained by a process comprising the step of thermally initiated cationic ring-opening polymerization of at least one oxetane having at least two reactive groups of which at least one is an oxetane group, said thermally initiated ring-opening polymerization being performed using an effective amount of at least one initiator and that terminal groups, prior to any optional further processing, in said hyperbranched dendritic polyether substantially are hydroxyl groups.

2. A hyperbranched dendritic polyether according to claim 1, wherein at least one oxetane is a compound of general formula:

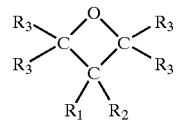

wherein $R_1$ is alkyl, alkyloxy, alkyloxyalkyl, aryloxyalkyl, hydroxyalkyl, hydroxyalkyloxy, aryl, aryloxy, hydroxyaryl or hydroxyaryloxy, $R_2$ is hydroxyalkyl, hydroxyalkyloxy, hydroxyaryl or hydroxyaryloxy, and wherein each $R_3$ independently is hydrogen, alkyl, alkyloxy, alkyloxyalkyl, aryloxyalkyl, hydroxyalkyl, hydroxyalkyloxy, aryl, aryloxy, hydroxyaryl or hydroxyaryloxy.

3. A hyperbranched dendritic polyether according to claim 2, wherein said alkyl is linear or branched alkanyl or alkenyl having 1 to 24 carbon atoms.

4. A hyperbranched dendritic polyether according to claim 1, wherein said at least one oxetane is an oxetane of a 2-alkyl-2-hydroxyalkyl-1,3-propanediol, a 2,2-di(hydroxyalkyl)-1,3-propanediol, a 2-alkyl-2-hydroxyalkyloxy-1,3-propanediol, a 2,2-di(hydroxyalkyloxy)-1,3-propanediol or a dimer, trimer or polymer of any of said 1,3-propanediols.

5. A hyperbranched dendritic polyether according to claim 4, wherein said alkyl is linear or branched alkanyl or alkenyl having 3 to 24, such as 4 to 12, carbon atoms.

6. A hyperbranched dendritic polyether according to claim 1, wherein said at least one oxetane is an oxetane of trimethylolethane, trimethylolpropane, pentaerythritol, ditrimethylolethane, ditrimethylolpropane or dipentaerythritol.

7. A hyperbranched dendritic polyether according to claim 1, wherein said at least one initiator is at least one onium salt.

8. A hyperbranched dendritic polyether according to claim 7, wherein said at least one onium salt is at least one sulphonium, at least one oxonium and/or at least one iodonium salt.

9. A hyperbranched dendritic polyether according to claim 8, wherein said at least one sulphonium salt is benzyltetramethylenesulphonium hexafluoroantimonate, benzyltetramethylenesulphonium hexafluorophosphate and/or benzyltetramethylenesulphonium trifluoromethanesulphonate.

10. A hyperbranched dendritic polyether according to claim 1, wherein said at least one initiator is at least one Lewis acid and/or at least one Brønsted acid.

11. A hyperbranched dendritic polyether according to claim 10, wherein said at least one Lewis acid is $BF_3$, $AlCl_3$, $FeCl_3$ and/or $SnCl_4$.

12. A hyperbranched dendritic polyether according to claim 10, wherein said at least one Brønsted acid is naphthalene sulphonic acid, para-toluene sulphonic acid, methane sulphonic acid, trifluoromethane sulphonic acid, trifluoroacetic acid, sulphuric acid and/or phosphoric acid.

13. A hyperbranched dendritic polyether according to claim 1, wherein said hyperbranched dendritic polyether is further processed, whereby at least one spacing or branching monomeric or polymeric chain extender has been added to at least one terminal hydroxyl group.

14. A hyperbranched dendritic polyether according to claim 13, wherein said at least one chain extender is at least one hydroxyfunctional carboxylic acid or lactone or is at least one polymer of at least one hydroxyfunctional carboxylic acid and/or at least one lactone.

15. A hyperbranched dendritic polyether according to claim 14, wherein said at least one hydroxyfunctional carboxylic acid is 2,2-bis(hydroxymethyl)propanoic acid, 2,2-bis(hydroxymethyl)butanoic acid, 2,2-bis(hydroxymethyl)pentanoic acid, 2,3-dihydroxypropanoic acid, hydroxypentanoic acid, hydroxypropanoic acid and/or 2,2-dimethyl-3-hydroxypropanoic acid.

16. A hyperbranched dendritic polyether according to claim 14, wherein said at least one lactone is β-propiolactone, γ-butyrolactone, δ-valerolactone, ε-caprolactone and/or ζ-enantholactone.

17. A hyperbranched dendritic polyether according to claim 1, wherein said hyperbranched dendritic polyether is further processed, whereby at least one monomeric or polymeric chain stopper has been added to at least one terminal hydroxyl group or to at least one chain extender.

18. A hyperbranched dendritic polyether according to claim 17, wherein said at least one chain stopper is selected from the group consisting of:
  i) a saturated or unsaturated monofunctional carboxylic acid,
  ii) an ester of at least one di, tri or polyfunctional carboxylic acid,
  iii) a glycidyl ester or ether,
  iv) an epoxidized monocarboxylic acid or triglyceride, and
  v) a diisocyanate or an oligomer or adduct of a diisocyanate.

19. A hyperbranched dendritic polyether according to claim 17, wherein said at least one chain stopper is selected from the group consisting of lauric acid, linseed fatty acid, soybean fatty acid, tall oil fatty acid, dehydrated castor fatty acid, crotonic acid, capric acid, caprylic acid, acrylic acid, methacrylic acid, benzoic acid, para-tert.butylbenzoic acid, abietic acid, sorbinic acid, epoxidised soybean fatty acid, trimethylolpropane diallyl ether maleate, toluene-2,4-diisocyanate, toluene-2,6-diisocyanate, hexamethylene diisocyanate, isophorone diisocyanate or a mixture of two or more of said chain stoppers.

20. A hyperbranched dendritic polyether according to claim 1, wherein said hyperbranched dendritic polyether is further processed, whereby at least one terminal hydroxyl group, at least one optional chain extender and/or at least one optional chain stopper has been subjected to epoxidation, allylation, acrylation and/or grafting.

21. A hyperbranched dendritic polyether according to claim 20, wherein said epoxidation is a reaction with at least one epihalohydrine.

22. A hyperbranched dendritic polyether according to claim 20, wherein said epoxidation is a reaction with at least one oxidizing agent selected from the group consisting of peroxy acids or anhydrides and haloperoxy acids or anhydrides.

23. A hyperbranched dendritic polyether according to claim 22, wherein said at least one oxidizing agent is peroxyformic acid, peroxyacetic acid, peroxybenzoic acid, m-chloroperoxybenzoic acid, trifluoroperoxyacetic acid or a mixture thereof or therewith.

24. A hyperbranched dendritic polyether according to claim 20, wherein said allylation is a reaction with at least one allylhalide.

25. A hyperbranched dendritic polyether according to claim 20, wherein said acrylation is a reaction with methacrylic, acrylic and/or crotonic acid or a corresponding anhydride or halide.

26. A process for manufacture of a hyperbranched dendritic polyether, which polyether optionally is subjected to further processing, wherein said process comprises the step of thermally initiated cationic ring-opened polymerization of at least one oxetane having at least two reactive groups of which at least one is an oxetane group, said thermally initiated ring-opening polymerization being performed using an effective amount of at least one initiator and said step yielding a hyperbranched dendritic polyether having terminal hydroxyl groups.

27. A process according to claim 26, wherein said at least one oxetane is a compound of general formula

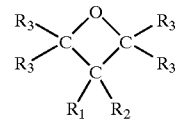

wherein $R_1$ is alkyl, alkyloxy, alkyloxyalkyl, aryloxyalkyl, hydroxyalkyl, hydroxyalkyloxy, aryl, aryloxy, hydroxyaryl or hydroxyaryloxy, $R_2$ is hydroxyalkyl, hydroxyalkyloxy, hydroxyaryl or hydroxyaryloxy, and wherein each $R_3$ independently is hydrogen, alkyl, alkyloxy, alkyloxyalkyl, aryloxyalkyl, hydroxyalkyl, hydroxyalkyloxy, aryl, aryloxy, hydroxyaryl or hydroxyaryloxy.

28. A process according to claim 27, wherein said alkyl is linear or branched alkanyl or alkenyl having 1 to 24 carbon atoms.

29. A process according to claim 26, wherein said at least one oxetane is an oxetane of a 2-alkyl-2-hydroxyalkyl-1,3-propanediol, a 2,2-di(hydroxyalkyl)-1,3-propanediol, a 2-alkyl-2-hydroxyalkyloxy-1,3-propanediol, a 2,2-di(hydroxyalkyloxy)-1,3-propanediol or a dimer, trimer or polymer of any of said 1,3-propanediols.

30. A process according to claim 29, wherein said alkyl is linear or branched alkanyl or alkenyl having 3 to 24 carbon atoms.

31. A process according to claim 26, wherein said at least one oxetane is an oxetane of trimethylolethane, trimethylolpropane, pentaerythritol, ditrimethylolethane, ditrimethylolpropane or dipentaerythritol.

32. A process according to claim 26, wherein said at least one oxetane is included in a mixture comprising in addition to said oxetane at least one additional oxetane having at least one oxetane group, at least one alcohol, at least one epoxide, at least one anhydride, at least one tetrahydrofuran and/or at least one lactone.

33. A process according to claim 32, wherein said at least one alcohol is an aliphatic, cycloaliphatic or aromatic mono, di, tri or polyalcohol selected from the group consisting of ethylene glycol, diethylene glycol, triethylene glycol, polyethylene glycol, propylene glycol, dipropylene glycol, tripropylene glycol, polypropylene glycol, neopentyl glycol, dimethylolpropane, glycerol, trimethylolethane, trimethylolpropane, pentaerythritol, ditrimethylolethane, ditrimethylolpropane, anhydroennea-heptitol, dipentaerythritol, sorbitol, mannitol, glycerol monallyl ether, glycerol diallyl ether, trimethylolpropane monoallyl ether, trimethylolpropane diallyl ether, pentaerythritol monoallyl ether, pentaerythritol diallyl ether, pentaerythritol triallyl ether, 4-hydroxymethyl-1,3-dioxolane, 5-methyl-5-hydroxymethyl-1,3-dioxane, 5-ethyl-5-hydroxymethyl-1,3-dioxane and 5,5-dihydroxymethyl-1,3-dioxane.

34. A processing according to claim 32, wherein said process comprises the step of charging said at least one oxetane to a mixture comprising said at least one alcohol and at least one initiator.

35. A process according to claim 32, wherein said at least one alcohol is a reaction product between glycerol, trimethylolethane, trimethylolpropane or pentaerythritol and at least one alkylene oxide, such as ethylene oxide, propylene oxide, butylene oxide, phenylethylene oxide or mixtures thereof.

36. A process according to claim 32, wherein said at least one epoxide is a condensation product between at least one phenol or at least one aldehyde, an oligomer of such a condensation product, a glycidyl ester or ether and/or a mono, di and triglycidyl substituted isocyanurate.

37. A process according to claim 32, wherein said at least one lactone is β-propiolactone, γ-butyrolactone, δ-valerolactone, ε-caprolactone and/or ζ-enantholactone.

38. A process according to claim 26, wherein said at least one initiator is at least one onium salt.

39. A process according to claim 38, wherein said at least one onium salt is at least one sulphonium, at least one oxonium and/or at least one iodonium salt.

40. A process according to claim 39, wherein said at least one sulphonium salt is benzyltetramethylenesulphonium hexafluoroantimonate, benzyltetramethylenesulphonium hexafluorophosphate and/or benzyltetramethylenesulphonium trifluoromethanesulphonate.

41. A process according to claim 26, wherein said at least one initiator is at least one Lewis acid and/or at least one Brønsted acid.

42. A process according to claim 41, wherein said at least one Lewis acid is $BF_3$, $AlCl_3$, $FeCl_3$ and/or $SnCl_4$.

43. A process according to claim 41, wherein said at least one Brønsted acid is naphthalene sulphonic acid, para-toluene sulphonic acid, methane sulphonic acid, trifluoromethane sulphonic acid, trifluoroacetic acid, sulphuric acid and/or phosphoric acid.

44. A process according to claim 26, wherein said process comprises the step of adding at least one spacing or branching monomeric or polymeric chain extender to at least one of said terminal hydroxyl groups.

45. A process according to claim 44, wherein said chain extender is at least one hydroxyfuncational carboxylic acid or lactone or is at least one polymer of at least one hydroxyfunctional carboxylic acid or lactone.

46. A process according to claim 45, wherein said at least one hydroxyfunctional carboxylic acid is 2,2-bis(hydroxymethyl)-propanoic acid, 2,2-bis(hydroxymethyl) butanoic acid, 2,2-bis(hydroxymethyl)pentanoic acid, 2,3-dihydroxypropanoic acid, hydroxypentanoic acid, hydroxypropanoic acid and/or 2,2-dimethyl-3-hydroxypropanoic acid.

47. A processing according to claim 45, wherein said at least one lactone is β-propiolactone, γ-butyrolactone, δ-valerolactone, ε-caprolactone and/or ζ-enantholactone.

48. A process according to claim 26, wherein said process comprises the step of adding at least one monomeric or polymeric chain stopper to at least one of said terminal hydroxyl groups or to at least one optional chain extender.

49. A process according to claim 48, wherein said at least one chain stopper is selected from the group consisting of:

i) a saturated or unsaturated monofunctional carboxylic acid, ii) an ester of at least one di, tri or polyfunctional carboxylic acid, iii) a glycidyl ester or ether, iv) an epoxidized monocarboxylic acid or triglyceride, and v) a diisocyanage or an oligomer or adduct of a diisocyanate.

50. A process according to claim 49, wherein said at least one chain stopper is selected from the group consisting of lauric acid, linseed fatty acid, soybean fatty acid, tall oil fatty acid, dehydrated castor fatty acid, crotonic acid, capric acid, caprylic acid, acrylic acid, methacrylic acid, benzoic acid, para-tert.butylbenzoic acid, abietic acid, sorbinic acid, epoxidized soybean fatty acid, trimethylolpropane diallyl ether maleate, toluene-2,4-diisocyanate, toluene-2,6-diisocyanate, hexamethylene diisocyanate and isophorone diisocyanate.

51. A process according to claim 26, wherein said process comprises the step of subjecting at least one of said terminal hydroxyl groups, at least one optional chain extender and/or at least one optional chain stopper to epoxidation, allylation, acrylation and/or grafting.

52. A process according to claim 51, wherein said epoxidation is performed as a reaction with at least one epihalohydrine, such as epichlorohydrine.

53. A process according to claim 51, wherein said epoxidation is performed as a reaction with at least one oxidizing agent, such as a peroxy acid or anhydride and/or a haloperoxy acid or anhydride.

54. A process according to claim 53, wherein said at least one oxidizing agent is peroxyformic acid, peroxyacetic acid, peroxybenzoic acid, m-chloroperoxybenzoic acid and/or trifluoroperoxyacetic acid.

55. A process according to claim 51, wherein said allylation is performed as a reaction with at least one allylhalide, such as allylchloride or allylbromide.

56. A process according to claim 51, wherein said acrylation is performed as a reaction with methacrylic, acrylic and/or crotonic acid or a corresponding anhydride or halide.

57. A hyperbranched dendritic polyether according to claim 1, wherein said hyperbranched dendritic polyether is further processed by at least one step selected from the group consisting of further chain extending, chain termination and functionalization.

58. A process according to claim 26, wherein said further processing comprises at least one step selected from the group consisting of further chain extending, chain termination and functionalization.

* * * * *